United States Patent [19]
Schulze

[11] 3,788,589
[45] Jan. 29, 1974

[54] ADJUSTABLE PICTURE FRAME HOLDER

[75] Inventor: Herbert Schulze, Bosperde, Germany

[73] Assignee: Firma R. Schulze & Co. KG, Bosperde, Germany

[22] Filed: Feb. 4, 1972

[21] Appl. No.: 223,567

[30] Foreign Application Priority Data
Feb. 18, 1971  Germany................ P 21 08 303.4

[52] U.S. Cl. .............................................. 248/488
[51] Int. Cl. ............................................. A47f 7/14
[58] Field of Search 248/300, 301, 316 A, 488, 490, 248/491

[56] References Cited
UNITED STATES PATENTS

| | | | |
|---|---|---|---|
| 928,132 | 7/1909 | Kaufman............................ | 248/490 |
| 1,839,016 | 12/1931 | Dodd................................. | 248/488 |
| 2,065,068 | 12/1936 | Gudeman........................... | 248/300 |
| 1,738,897 | 12/1929 | Harbert............................. | 248/300 X |
| 2,696,962 | 12/1954 | Goss................................. | 248/488 X |
| 3,237,898 | 3/1966 | Goss................................. | 248/488 X |

Primary Examiner—William H. Schultz
Attorney, Agent, or Firm—David Toren et al.

[57] ABSTRACT

An adjustable holder for supporting the spaced parallel side surfaces of an object, such as a picture frame, includes a supporting part adjustably interconnected to a clamping part by an extension member which is rigidly secured to the supporting part. Supporting part has an A-shape formed by a pair of diverging legs connected adjacent their free ends by a cross member. Hooks on the free ends of the legs provide the holding action for one side of the object. The clamping part includes a metal plate containing a guide way, in which the extension member is secured by a snap spring, and a clamp held on the metal plate by another guide way and a spring member. The clamp has a hook for securing the other parallel side of the ojbect. At the end of the metal plate spaced from the supporting part a suspension member is formed which also provides a cover for one end of the extension member. The extension member contains spaced openings in which the snap spring engages for selectively adjusting the holder.

7 Claims, 3 Drawing Figures

ADJUSTABLE PICTURE FRAME HOLDER

SUMMARY OF THE INVENTION

The present invention is directed to an adjustable holder or hanger for supporting an object between two parallel side surfaces or edges, such as a picture frame, and, more particularly, it concerns a holder formed of a supporting part for holding the object along its lower side and a clamping part including a elastically mounted clamp which embraces the object along its upper side. In known adjustable holders it has been found in use that the holder can only be used with a certain size of object.

Another known adjustable frame consists of a short supporting arm and a clamping part, the supporting arm includes a hook while the clamping part includes a clamp under the action of a pair of springs. The clamping part is arranged so that it can be turned and displaced, such as in the plane of a picture frame, under the action of one of the springs. At the end of the clamping part which cooperates with the supporting arm, slots are provided which are engaged by the hook on the supporting arm. The different slots in the clamping part offer the possibility of adjusting the holder for different picture frame sizes, however, it has the disadvantage that it involves two independent parts which must be put together manually. Further, the extension of the clamping part which includes the slots moves about a hinge and such an arrangement considerably increases the manufacturing costs of the holder.

It is the primary object of the present invention to provide an adjustable holder in which the clamping part can remain unchanged for the range of adjustment while the supporting part is varied in its length. Another object of the invention is to provide an arrangement in which the clamping part and supporting part are guided one within the other during the holding action to afford an easy assembly.

Therefore, in accordance with the present invention, an adjustable holder is provided by forming the clamping part of a smooth metal plate in which a guide way is formed for an extension member, rigidly secured to the supporting arm, and a spring is secured to the metal plate and snaps into a recess or opening in the extension member.

Based on the design embodying the present invention, a great advantage is gained in that the supporting part and the clamping part can hold the object, such as a picture frame, as a unit, after which the extension member can be pushed in its guide way into the clamping part until the spring snaps into place. This assembly can be easily handled by one person, even if it is necessary to hold the object at the same time.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
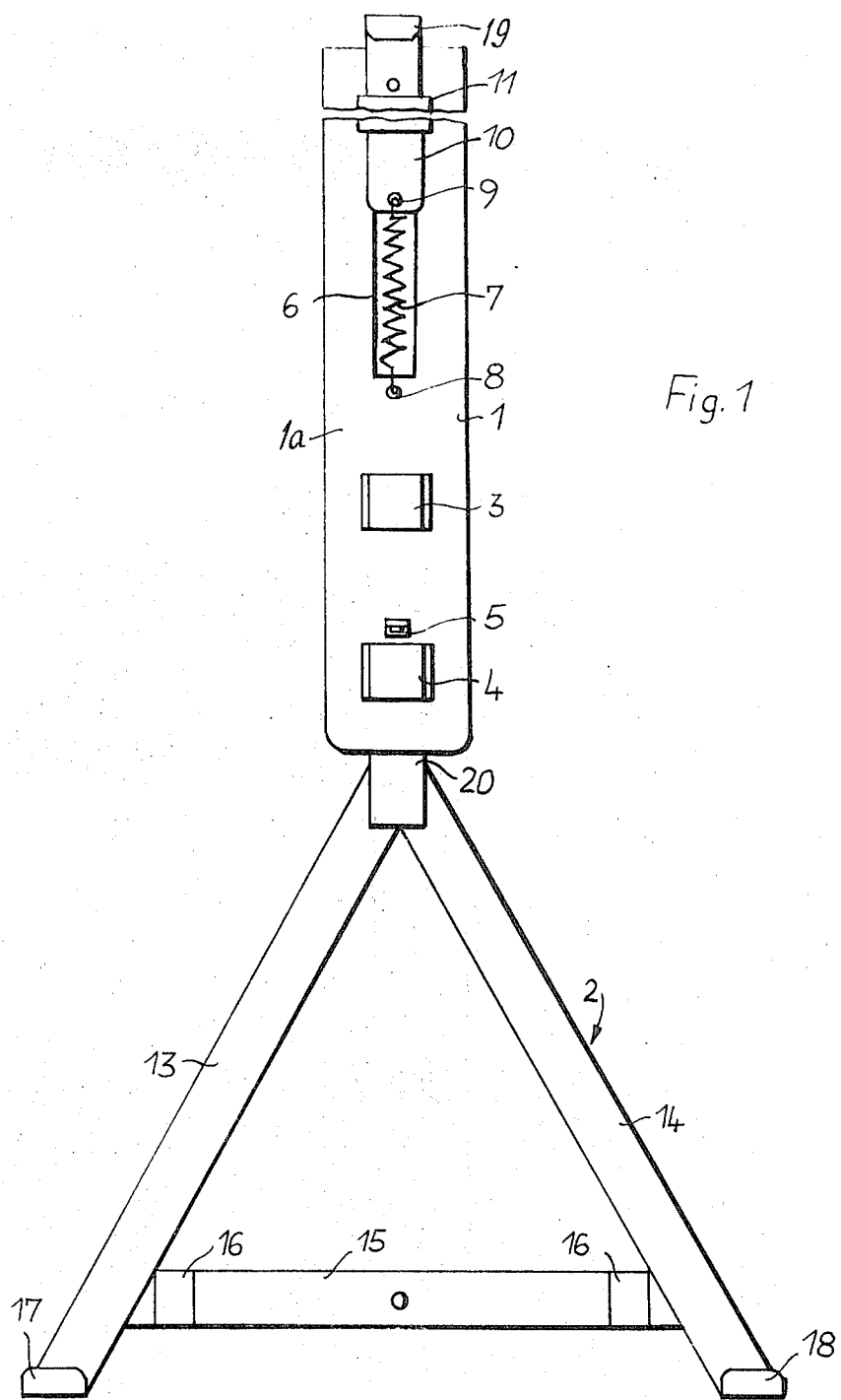
FIG. 1 is an elevational view of an adjustable holder in accordance with the present invention.

In FIG. 1 an adjustable holder or hanger is illustrated which consists of a longitudinally extending clamping part 1 and an A-shaped supporting part 2. In FIG. 1 the front side 1a of the clamping part is shown while in FIG. 2 the rear side 1b is shown. The clamping part is formed of a flat metal plate from which a pair of channel-shaped lugs 3,4 are punched out so that they project from the second side 1b of the clamping part. The lugs 3 and 4 are located adjacent the end of the clamping part from which the supporting part 2 extends and another channel-shaped lug 11 is provided at the opposite end of the clamping part amd extends outwardly from its front side 1a. Together the lugs 3 and 4 form a guide way extending in the elongated direction of the clamping part. Located between the lugs 3,4 in the metal plate forming the clamping part is a rectangular hole 5. In the upper portion of the clamping part 1, as viewed in FIG. 1, that is above the lugs 3 and 4, there is an elongated slot 6 in which a spring 7 is positioned. At one end the spring is secured into a holding hole 8 in the clamping part and at its other end the spring is secured into a suspension hole 9 in a clamp 10. The clamp 10 extends from the end of the spring through the guide way formed by the lug 11 and it has a hook 19 at its end spaced from the spring which projects, as shown in FIG. 1, from the upper end of the clamping part 1.

Figure 2:
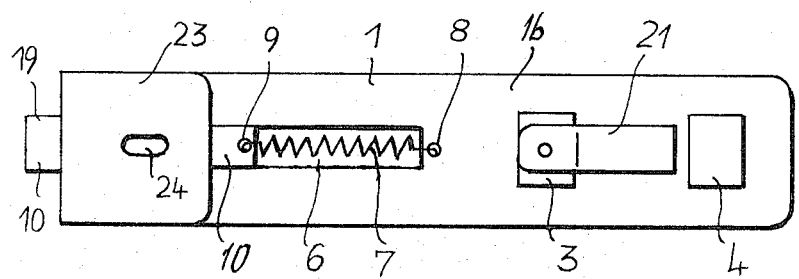
FIG. 2 is a view of a portion of the adjustable holder shown in FIG. 1 viewed from the opposite side.
Figure 3:
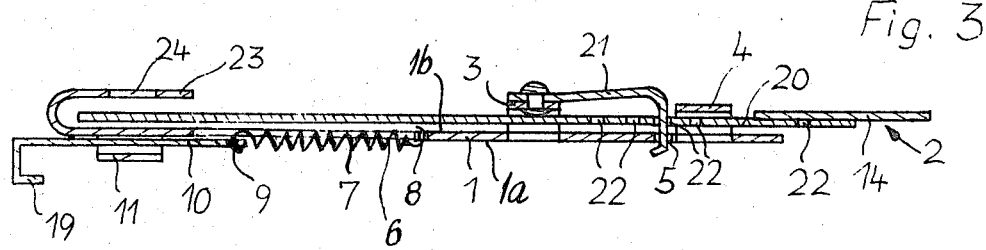
FIG. 3 is a sectional side view of the part shown in FIG. 2 along with a portion of the other part shown in FIG. 1 with the two parts in interconnected relationship.

As shown in FIG. 1, the supporting part 2 is provided with its A-shaped configuration by a pair of sides 13,14 which diverge downwardly from an apex located at the lower end of an extension member 20. To complete the A-shaped configuration a cross member or bridge 15 extends between the lower ends of the diverging sides 13 and 14 and the cross member is provided with corrugations 16. The lower or spaced ends of the sides 13, 14 are each provided with a hook 17, 18, respectively. Accordingly, the lower side of the object to be secured in the holder is held by the hooks 17 and 18 on the sides of the supporting part while the hook 19 on the clamp 10 holds the upper side of the object. Rigidly secured to and extending upwardly from the apex of the A-shaped supporting part 2 is the extension member 20 which is positioned within the guide way formed by the channel-shaped lugs 3 and 4 extending from the rear side of the clamping part 1. As shown in FIGS. 2 and 3, a snap spring 21, secured to the lug 3, secures the extension member 20 to the clamping part 1. As illustrated in FIG. 3, a plurality of openings 22 are provided in the extension member 20 and are spaced apart along its elongated direction which is the same as the elongated direction or length of the clamping part 1. The snap spring 21 extends from the lug 3 and is bent at its end so that it passes through one of the openings in the extension member and then passes through the rectangular opening or hole 5 in the clamping part 1. The upper end of the clamping part 1, that is the left hand end as viewed in FIGS. 2 and 3, is provided with a return bend suspension member 23 in which an elongated slot or hole 24 is formed. The return bend 23 is formed so tht the upper end of the extension member 20 is that or covered by the return bend.

In mounting the adjustable holder on an object, such as a picture frame, the assembly operation is carried out as follows:

Depending on the size of the object to be supported, the snap spring 21 is fitted into a corresponding recess or opening 22 in the extension member 20 and then into the rectangular hole 5 in the clamping part 1. Next, with the supporting part 2 and the clamping part 1 interconnected as a unit, the holder is fitted over the two parallel side surfaces of the object so that the object is engaged between the hooks 17 and 18 on the lower side and the hook 19 on the upper side. Due to the action of the spring 7 which biases the clamp 10 on the clamping part 1, the holder is self-supporting.

As can be seen in FIG. 3, the hook 19 extends from the front side 1a of the clamping part and the hooks 17 and 18 extend from the corresponding side of the supporting part 2. On the opposite side of the clamping part 1 the suspension member 23 provides a cover over the sharp edges on the end of the extension member 20.

The extent to which the corrugations 16 extend from the cross member 15 is such that the outer surfaces of the corrugations lie in the same plane as the suspension member 23 at the upper end of the clamping part. This arrangement insures that the object supported in the holder is positioned an equal distance from the wall or other surface on which it is mounted. It can be appreciated that an additional suspension member 23 can be provided on the cross member 15.

Further, it should also be understood that the channel-shaped lugs 3 and 4 can be joined so that a guide way of greater extension is formed.

While a specific embodiment of the invention has been shown and described in detail to illustrate the application of the inventive principles, it will be understood that the invention may be embodied otherwise without departing from such principles.

What is claimed is:

1. Adjustable holder for supporting two parallel side surfaces of an object, such as the upper and lower edge surfaces of a picture frame, including a supporting part for holding the object along its lower side surface and a clamping part for elastically holding the object along its upper side surface, where in the improvement comprises that said clamping part includes an elongated metal plate having a first side and an oppositely facing second side and said metal plate shaped to form a guide way on said first side, an extension member rigidly secured to said supporting part, said extension member extending along the first side of said metal plate and fitted into the guide way in said first side thereof, means for adjustably securing said extension member to said metal plate, the guide way in the first side of said metal plate comprising at least two channel-shaped lugs punched outwardly from the first side and said lugs spaced apart in the elongated direction of said metal plate, said extension member having a plurality of openings therethrough spaced apart in the direction of said extension member extending along said metal plate, said metal plate having a hole therethrough located between said channel-shaped lugs, and said means for adjustably securing said extension member to said metal plate comprising a snap spring secured to one of said channel-shaped lugs and selectively positionable through one of the openings in said extension member and fitted at its end spaced from its attachment to said lug into the hole in said metal plate between said lugs.

2. Adjustable holder for supporting two parallel side surfaces of an object, such as the upper and lower edge surfaces of a picture frame, including a supporting part for holding the object along its lower side surface and a clamping part for elastically holding the object along its upper side surface, wherein the improvement comprises that said clamping part includes an elongated metal plate having a first side and an oppositely facing second side and said plate shaped to form a guide way on said first side, an extension member rigidly secured to said supporting part, said extension member extending along the first side of said metal plate and fitted into the guide way in said first side thereof, means for adjustably securing said extension member to said plate, suspension means for said adjustable holder formed on said clamping part, said supporting part extending from one end of said metal plate of said clamping part, said suspension means being formed in the other end of said metal plate and extending from the first side thereof, said suspension means comprising a return bend formed in the end of said metal plate and a hole formed in said return bend portion of said metal plate, and the end of said extension members spaced from said supporting part extending along said metal plate and terminating within said return bend portion of said metal plate so that the end of said extension member is covered by said return bend portion.

3. Adjustable holder for supporting two parallel side surfaces of an object, such as the upper and lower edge surfaces of a picture frame, including a supporting part for holding the object along its lower side surface and a clamping part for elastically holding the object along its upper side surface, wherein the improvement comprises that said clamping part includes an elongated metal plate having a first side and an oppositely facing second side and said metal plate shaped to form a guide way on said first side, an extension member rigidly secured to said supporting part, said extension member extending along the first side of said metal plate and fitted into the guide way in said first side thereof, means for adjustably securing said extension member to said metal plate, suspension means for said adjustable holder being formed on said clamping part, said supporting part extending from one end of said metal plate of said clamping part, said suspension means are formed in the other end of said metal plate and extend from the first side thereof, said supporting part having an A-shaped configuration with its apex connected to said extension member, said supporting part comprising a pair of legs diverging from its apex and a cross member interconnecting said legs adjacent their free ends, in said cross member having at least one corrugation therein formed outwardly therefrom and the same direction as said suspension means extends from said clamping part.

4. Adjustable holder for supporting two parallel side surfaces of an object, such as the upper and lower edge surfaces of a picture frame, including a supporting part for holding the object along its lower side surface and a clamping part for elastically holding the object along its upper side surface, wherein the improvement comprises that said clamping part includes an elongated metal plate having a first side and an oppositely facing second side and said metal plate shaped to form a guide way on said first side, an extension member rigidly secured to said supporting part, said extension member extending along the first side of said metal plate and fitted into the guide way in said first side thereof, means for adjustably securing said extension member to said plate, the guide way in the first side of said metal plate comprising at least two channel-shaped lugs punched outwardly from the first guide and said lugs spaced apart in the elongated direction of said metal plate, said metal plate having another channel-shaped lug formed on the second side thereof adjacent the end of said metal plate opposite the end from which said supporting part extends, a slot formed in said metal plate between the location of said lugs on said first side and said lug on said second side, said slot extending in the elongated direction of said metal plate, a spring positioned within said slot and fixed at one end to said metal plate at the end of said slot closer to said supporting part, said clamping part including a clamp extending in the elongated direction of said metal plate and fitted into said another channel-shaped lug on the second side of said metal plate, and said spring connected at its other end to one end of said clamp for elastically holding said clamp to said metal plate.

5. Adjustable holder, as set forth in claim 2, wherein said extension member has a width less than the width of said metal plate.

6. Adjustable holder, as set forth in claim 9, wherein the free ends of said legs of said supporting part have hooks formed thereon extending in the direction outwardly from the second side of said metal plate.

7. Adjustable holder, as set forth in claim 4, wherein the end of said clamp opposite the end connected to said spring is bent in a hook shaped configuration and is arranged for elastically holding the upper side of the object supported by said adjustable holder.

* * * * *